E. ROBBINS.
IRRIGATING DEVICE.
APPLICATION FILED FEB. 10, 1920.
1,394,041.
Patented Oct. 18, 1921.
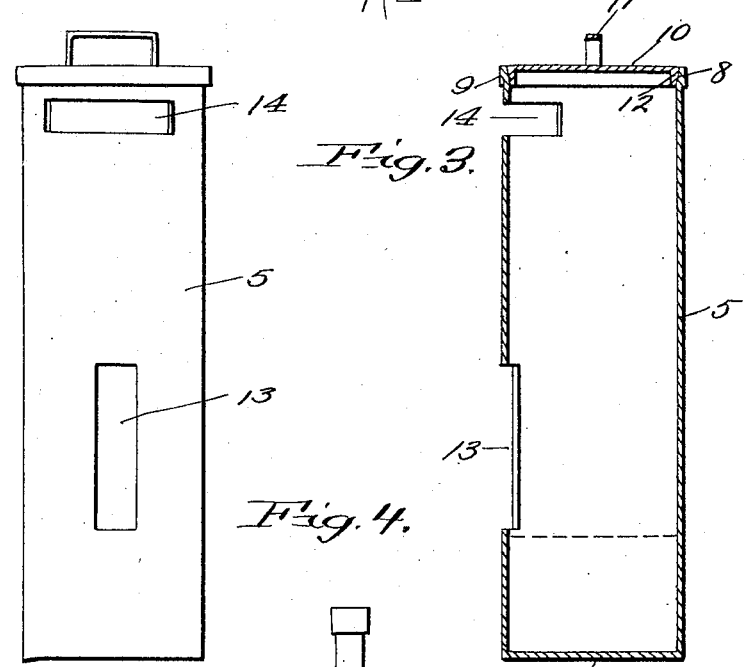
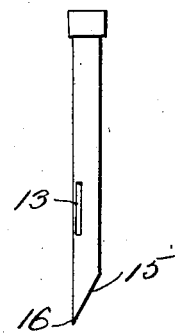
Inventor
Evelyn Robbins

UNITED STATES PATENT OFFICE.

EVELYN ROBBINS, OF RICHMOND, CALIFORNIA.

IRRIGATING DEVICE.

1,394,041.  Specification of Letters Patent.  Patented Oct. 18, 1921.

Application filed February 10, 1920. Serial No. 357,526.

*To all whom it may concern:*

Be it known that I, EVELYN ROBBINS, a citizen of the United States, residing at Richmond, in the county of Contra Costa and State of California, have invented certain new and useful Improvements in an Irrigating Device, of which the following is a specification.

My invention relates to improvements in irrigating devices and has for its object to produce an article of this character for use primarily in regions relying upon artificial means for cultivating trees, plants, and other similar products, that will accomplish the same result acquired by devices heretofore used for this purpose, and yet is simple in construction, reliable in operation, and inexpensive to manufacture.

A further object of my invention lies in the provision of a device of this character for insertion in the ground adjoining the product to be cultivated, so that the lower roots of the plant or tree will be thoroughly moistened, thus strengthening and improving the product considerably.

Other objects and advantages of the invention will be apparent during the course of the following description.

In the accompanying drawings forming a part of this specification and in which like numerals are employed to designate like parts throughout the same, Figure 1, is an illustrated view showing my improved device in use;

Fig. 2, is a side view of the improved device;

Fig. 3, is a vertical sectional view of the invention, and

Fig. 4, is a reduced side view of a modified form.

In the drawings, wherein for the purpose of illustration, I have shown a preferred embodiment of my invention, the numeral 5 designates a tubular receptacle or container closed at one end by the horizontal plate 7 which is formed integrally therewith. The interior of the opposite end is flared slightly outwardly as at 8, being reinforced by the annular collar 9. This end is covered by the removable cap 10 which is of circular configuration and provided with the handle 11 formed integrally therewith. This cap has an annular flange 12 depending downwardly and beveled throughout its circumferential outer edge, to correspond with the flared out portion 8 of the receptacle upon which it is seated. This structure permits the receptacle to be sealed if desired, which action is accomplished by driving the cap downwardly within the container.

Arranged adjacent the closed end of the receptacle is a longitudinally extending rectangular opening 13, through which the water contained in the receptacle passes through to the roots of the product being cultivated. Adjacent the upper end of the receptacle is a circumferentially extending rectangular opening 14 which may be used for filling the receptacle with water and fertilizer.

The modification of my invention shown in Fig. 4 is of identically the same structure as the form previously described, with the exception of the lower end which is cut diagonally as at 15, to form the point 16 which facilitates the driving of the receptacle into the ground. Attention is called to the fact that the dispensing opening 13 in the modified form, is arranged on the same side of the receptacle as the point 16. By constructing the device in this manner, the dirt which is pushed to the side by the wedging of the receptacle in the ground will be forced toward the opposite side of the receptacle to that of the opening, thus preventing the same from being clogged and packed with dirt.

In operation, the receptacle may be constructed of any suitable material, such as concrete, metal, or galvanized tin. The device is placed adjacent the trunk of the tree or plant, and may either be driven in the ground or a hole dug for insertion therein. The receptacle is then partially filled with fertilizer, over which a quantity of water is placed that will slowly drain through the opening 13 and moisten the roots of the tree in the surrounding area. This mode of irrigation cultivates the roots of the trees to grow deeper, thus strengthening and improving the condition of the tree considerably. In case it should be necessary to seal up the closure cap the receptacle may be filled through the opening 14 provided for that purpose. Normally, the upper end of the receptacle is flush with the surface of the ground and consequently cannot be easily detected by trespassers. From the foregoing it is obvious that a device has been constructed which is of a very simple structure and could undoubtedly be manufactured at a very small cost. The shape of all the parts being of a well known figuration could possibly be obtained at a very low cost.

It is to be understood that the form of my invention herewith shown and described, is to be taken as a preferred example of the same, and that certain changes in the shape, size, and arrangement of parts may be resorted to without departing from the spirit of the invention or the scope of the subjoined claims.

Having thus fully described my invention, I claim:—

1. An irrigating device comprising a tubular receptacle closed at one end, a longitudinally extending opening adjacent its closed end, a circumferentially extending opening adjacent its opposite end, and a removable cap associated with said opposite end.

2. An irrigating device comprising a tubular receptacle, said receptacle having one end diagonally cut forming a point, a longitudinal opening adjacent the lower end of the receptacle on the same side as the point, an opening near the upper end in alinement with the lower opening, and a closure cap for the receptacle.

3. An irrigating device including a tubular receptacle permanently closed at one end, a longitudinally extending opening adjacent its closed end, a circumferentially extending opening adjacent its upper end, said upper end having its interior edge flared outwardly, and a closure cap having a beveled peripheral flange for closing said end.

In testimony whereof, I have affixed my signature in the presence of two witnesses.

EVELYN ROBBINS.

Witnesses:
John B. Maxwell,
Geo. A. Duera.